United States Patent
Hejl

(10) Patent No.: US 9,443,123 B2
(45) Date of Patent: Sep. 13, 2016

(54) SYSTEM AND METHOD FOR INDICIA VERIFICATION

(71) Applicant: Hand Held Products, Inc., Fort Mill, SC (US)

(72) Inventor: Benjamin Hejl, Cherry Hill, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/334,934

(22) Filed: Jul. 18, 2014

(65) Prior Publication Data

US 2016/0019406 A1    Jan. 21, 2016

(51) Int. Cl.
*G06K 7/10* (2006.01)
*G06K 7/14* (2006.01)
*H04N 21/44* (2011.01)

(52) U.S. Cl.
CPC ........ *G06K 7/146* (2013.01); *H04N 21/44008* (2013.01)

(58) Field of Classification Search
USPC ............ 235/462.07, 462.11, 462.09, 462.25
See application file for complete search history.

(56) References Cited

U.S. PATENT DOCUMENTS

| | | | |
|---|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 13/367,978, filed Feb. 7, 2012, (Feng et al.); now abandoned.

(Continued)

*Primary Examiner* — Ahshik Kim
(74) *Attorney, Agent, or Firm* — Additon, Higgins & Pendleton, P.A.

(57) ABSTRACT

An indicia-verification system acquires video and analyzes the video to determine whether it contains any images of an indicia that are of sufficient quality to merit the initiation of indicia verification. If the video is of sufficient quality, the system acquires a high resolution still image of the indicia. If the still image is of sufficient quality, an indicia-analysis subsystem performs indicia verification on the still image of the indicia.

17 Claims, 3 Drawing Sheets

(56) References Cited

U.S. PATENT DOCUMENTS

| | | |
|---|---|---|
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2009/0212113 A1* | 8/2009 | Chiu et al. ............ 235/462.41 |
| 2009/0294539 A1* | 12/2009 | Kim .................... 235/462.01 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |

(56) References Cited

U.S. PATENT DOCUMENTS

| | | |
|---|---|---|
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131445 A1 | 5/2014 | Ding et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |
| 2015/0113068 A1* | 4/2015 | Boudville ............... 709/205 |

OTHER PUBLICATIONS

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control, filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination, filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion, filed Mar. 4, 2014 (Lui et al.); 25 pages.

U.S. Appl. No. 14/342,544 for Imaging Based Barcode Scanner Engine with Multiple Elements Supported on a Common Printed Circuit Board, filed Mar. 4, 2014 (Liu et al.); 27 pages.

U.S. Appl. No. 14/257,174 for Reading Apparatus Having Partial Frame Operating Mode, filed Apr. 21, 2014, (Barber et al.), 67 pages.

U.S. Appl. No. 14/200,405 for Indicia Reader for Size-Limited Applications, filed Mar. 7, 2014 (Feng et al.); 42 pages.

U.S. Appl. No. 14/166,103 for Indicia Reading Terminal Including Optical Filter, filed Jan. 28, 2014 (Lu et al.); 29 pages.

U.S. Appl. No. 14/274,858 for Mobile Printer With Optional Battery Accessory, filed May 12, 2014, (Marty et al.), 26 pages.

U.S. Appl. No. 14/264,173 for Autofocus Lens System for Indicia Readers, filed Apr. 29, 2014, (Ackley et al.), 39 pages.

U.S. Appl. No. 14/230,322 for Focus Module and Components with Actuator, filed Mar. 31, 2014 (Feng et al.); 92 pages.

U.S. Appl. No. 14/222,994 for Method and Apparatus for Reading Optical Indicia Using a Plurality of Data, filed Mar. 24, 2014 (Smith et al.); 30 pages.

(56) References Cited

OTHER PUBLICATIONS

U.S. Appl. No. 14/231,898 for Hand-Mounted Indicia-Reading Device with Finger Motion Triggering, filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.

* cited by examiner

SYSTEM AND METHOD FOR INDICIA VERIFICATION

FIELD OF THE INVENTION

The present invention relates to indicia verifiers, such as barcode verifiers. More specifically, the present invention relates to a system and method for indicia verification.

BACKGROUND

Indicia readers, such as barcode scanners, are typically configured to acquire information from indicia (e.g., barcodes, 1-D barcodes, 2-D barcodes, matrix barcodes, QR codes, etc.) and then decode that information for use in information systems. Businesses, in particular, have come to rely on indicia readers for efficient and reliable data entry. For example, indicia readers are frequently employed in retail stores at the point of sale to enable fast and accurate entry of pricing information into the cash register system. Indicia readers are also prevalent in warehouses and other settings where they are commonly used to track inventory.

Because information systems have grown so dependent upon indicia readers for data entry, the integrity of these information systems greatly depends upon the ability of an indicia reader to quickly and accurately decode indicia. Indicia are commonly printed on an item or its label or packaging. Many factors, including the quality of the printing process and the type of material on which the indicia is printed, can affect the quality of the printed indicia. Poor quality indicia (e.g., poorly printed indicia) can lead to costly and time-consuming mistakes. For example, printing defects can cause light spots (e.g., voids) in areas of a barcode that are supposed to be dark. This can result in the indicia reader mistakenly interpreting the defective area as being a light area instead of a dark area, thereby corrupting the decoding of the indicia. Especially for enterprises that read an extremely large volume of indicia each day, even a very small percentage of indicia misreads can render a given information system unusable.

Because of the importance of reliable data entry, and because of the significant harm that can result from indicia having poor quality, industries typically enforce minimum quality standards for indicia. During the 1980s, for example, an ANSI/ISO grading structure was established for barcode print quality.

Current barcode scanners typically are not equipped with high-resolution image sensors necessary for extracting the fine details of an indicia that are required for performing an indicia verification analysis. Barcode verifiers are specialized devices that have been developed to analyze the quality of barcodes and ensure compliance with minimum quality standards. Barcode verifiers can be used in various settings, but are frequently used by the barcode creator to ensure that the printed barcodes comply with minimum specifications. Before the items bearing indicia are introduced into the stream of commerce, the manufacturer may test all or some (e.g., randomly) of the indicia to ensure that the indicia are continually printed in conformity with established standards.

Although barcode verifiers effectively evaluate the quality of indicia, such as barcodes, reliance on these verification devices does have drawbacks. Barcode verifiers tend to be expensive. In part due to their significant cost, businesses may not be able to invest in enough barcode verifiers to have them placed at all locations where they are needed. This can result in delays in verification or in the neglecting of verification. Furthermore, businesses that use a barcode verifier may have the verifier in a physical location that is not readily accessible in all necessary instances. Ensuring that verification technology is available at all locations where barcode scanning is being conducted would improve a business' ability to verify that barcodes are being properly created and scanned.

Therefore, a need exists for a system for indicia verification that is both portable and relatively inexpensive. A system that harnesses the computing power and imaging capabilities of modern mobile computing devices would allow businesses to conduct indicia verification at a greater number of locations, thereby increasing their ability to ensure the integrity of printed indicia upon which their information systems depend.

SUMMARY

Accordingly, in one aspect, the present disclosure embraces an indicia-verification system. The indicia-verification system includes an imaging subsystem for acquiring video and still images. The system also includes an indicia-detection subsystem for analyzing the video acquired by the imaging subsystem to determine whether the video contains an indicia. The system also includes a video-analysis subsystem for analyzing the video acquired by the imaging subsystem to determine whether the video of the indicia is of sufficient quality to merit the initiation of indicia verification. The system also includes a still-image-analysis subsystem for selecting for indicia verification a still image of the indicia that is of sufficient quality to undergo indicia verification. The system also includes an indicia-analysis subsystem for performing indicia verification on the selected still image of the indicia.

In one embodiment, the imaging subsystem comprises an imager and a display device.

In another embodiment, the imager has a field-of-view, and the display device is configured to display video and still images of objects that are within the imager's field-of-view.

In yet another embodiment, the imager comprises a lens assembly and an image sensor.

In yet another embodiment, the determination of whether the video of the indicia is of sufficient quality to merit the initiation of indicia verification includes an analysis of the video's resolution.

In yet another embodiment, the determination of whether the video of the indicia is of sufficient quality to merit the initiation of indicia verification includes an analysis of the position of the indicia in the video, wherein the position of the indicia includes the distance of the indicia from the imaging subsystem's lens assembly and the orientation of the indicia with respect to the imaging subsystem's lens assembly.

In yet another embodiment, the determination of whether the video of the indicia is of sufficient quality to merit the initiation of indicia verification includes an analysis of the contrast of the video.

In yet another embodiment, the determination of whether the video of the indicia is of sufficient quality to merit the initiation of indicia verification includes an analysis of the video's motion blur.

In yet another embodiment, the determination of whether the video of the indicia is of sufficient quality to merit the initiation of indicia verification includes an analysis of (i) the video's resolution, (ii) the position of the indicia in the video, wherein the position of the indicia includes the distance of the indicia from the imaging subsystem's lens assembly and the orientation of the indicia with respect to the imaging subsystem's lens assembly, and (iii) the contrast of the video.

In yet another embodiment, the imaging subsystem is configured to acquire still images at a substantially higher resolution than the video acquired by the imaging subsystem.

In yet another embodiment, when the video-analysis subsystem determines that the video of the indicia is of sufficient quality to merit the initiation of indicia verification, the imaging-subsystem stops acquiring video and acquires a still image of the indicia.

In yet another embodiment, the imaging system continuously acquires a new still image of the indicia until the still-image-analysis subsystem selects a still image that is of sufficient quality to undergo indicia verification.

In yet another embodiment, the video-analysis subsystem comprises a user-feedback module for providing the user with feedback for improving the video of the indicia.

In yet another embodiment, the feedback provided by the user-feedback module includes instructions to move the indicia either closer to or farther from the imaging subsystem.

In yet another embodiment, the feedback provided by the user-feedback module includes a targeting graphic.

In yet another embodiment, the feedback provided by the user-feedback module includes audible instructions.

In another aspect, the present disclosure embraces an indicia-verification system that includes an imaging subsystem for acquiring video and still images. The system also includes an indicia-detection subsystem for analyzing the video acquired by the imaging subsystem to determine whether the video contains an indicia. The system also includes a video-analysis subsystem for analyzing the video acquired by the imaging subsystem to determine whether the video of the indicia is of sufficient quality to merit the initiation of indicia verification. The system also includes a still-image-analysis subsystem for selecting for indicia verification a still image of the indicia that is of sufficient quality to undergo indicia verification. The system also includes an indicia-analysis subsystem for (i) acquiring the selected still image of the indicia from the still-image-analysis subsystem; (ii) transmitting the selected still image via a communications network to a remote server configured to perform indicia verification on the selected still image; and (iii) receiving from the remote server via the communications network the results of the indicia verification.

In one embodiment, the indicia-analysis subsystem is configured for displaying the results of the indicia verification on a display device.

In another aspect, the present disclosure embraces an indicia-verification method. Video is analyzed to determine whether the video contains an indicia. If the video contains an indicia, the video is analyzed to determine whether the video of the indicia is of sufficient quality to merit the initiation of indicia verification. If the video of the indicia is of sufficient quality to merit the initiation of indicia verification, a still image of the indicia is acquired. The still image of the indicia is analyzed to determine if the still image is of sufficient quality to undergo indicia verification. If the still image of the indicia is of sufficient quality to undergo indicia verification, indicia verification is performed on the still image.

In one embodiment, the results of the indicia verification are displayed on a display device.

In another embodiment, still images of the indicia are continuously acquired until a still image is acquired that is of sufficient quality to undergo indicia verification.

The foregoing illustrative summary, as well as other exemplary objectives and/or advantages of the disclosure, and the manner in which the same are accomplished, are further explained within the following detailed description and its accompanying drawings.

DETAILED DESCRIPTION

The present disclosure embraces a system for indicia verification. As used in this disclosure, the term indicia is intended to refer broadly to various types of machine-readable indicia, including barcodes, QR codes, matrix codes, 1D codes, and 2D codes, machine-readable characters, etc. The indicia are typically graphical representations of information (e.g., data) such as product numbers, package-tracking numbers, or personnel identification numbers. Indicia readers are used to decode indicia (e.g., convert the graphical information into the alphanumerical data that the graphical information represents). The use of indicia readers to input data into a system, rather than manual data entry, results in generally faster and more reliable data entry. An indicia reader may embrace various kinds of devices used to read indicia, such as handheld barcode scanners (e.g., barcode readers), fixed-position omni-directional barcode scanners, pen-type readers, laser scanners, CCD readers, imaging scanners, and mobile devices like smartphones that are equipped to read indicia, and similar devices.

The recent proliferation of mobile computing devices, such as smartphones and tablet computers, provides an opportunity to leverage the imaging and computing power of these devices to allow for simplified barcode verification in more locations. Because these mobile computing devices are relatively inexpensive, deployment of barcode-verification-capable mobile computing devices at all critical areas of an enterprise is generally more feasible than distribution of expensive barcode verifiers that are commonly used in business today. The indicia-verification system according to the present disclosure is configured to utilize the computing and imaging power available on a typical modern smartphone, for example, to provide an effective and efficient barcode verification solution.

Figure 1:
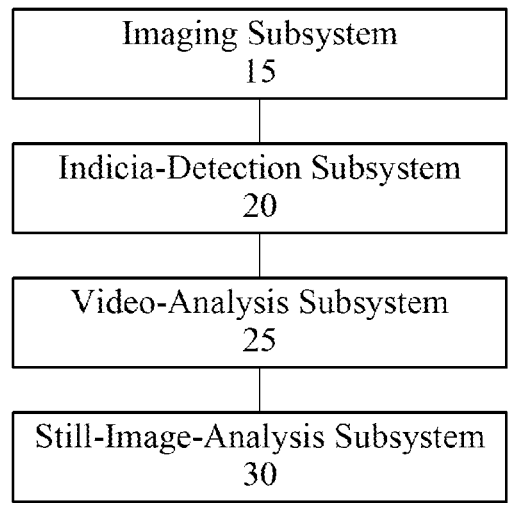
FIG. 1 is a block diagram illustrating an exemplary indicia-verification system according to the present disclosure.
Figure 2:
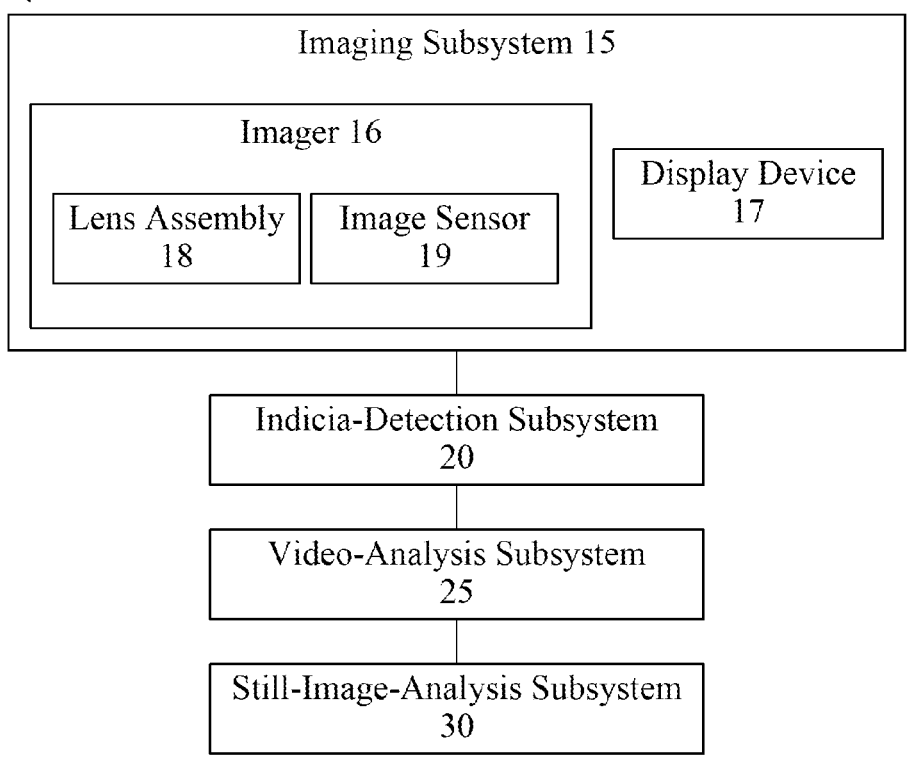
FIG. 2 is a block diagram illustrating a first alternative embodiment of an exemplary indicia-verification system according to the present disclosure.

Referring now to FIGS. 1 and 2, the indicia-verification system 10 according to the present disclosure includes an imaging subsystem 15. The imaging subsystem 15 is configured to acquire video and still images. Typically, the imaging subsystem 15 has a field-of-view and is adapted to acquire video and still images of objects, including objects bearing indicia, within the imaging subsystem's field-of-view.

In one embodiment, the imaging subsystem 15 includes an imager 16 for acquiring video and still images in the form of digital electronic files (e.g., digital video and digital still images). The imager 16 may be a digital camera that includes a lens assembly 18 for focusing light onto an image sensor 19 such as a charged-couple device (CCD) or complementary metal-oxide-semiconductor (CMOS) image sensor. The image sensor 19 converts the optical signal received through the lens assembly 18 (e.g., light reflected from objects within the imager's field of view to the lens assembly) into a digital signal capable of being processed by the indicia-verification system 10.

The indicia-verification system 10 according to the present disclosure also includes an indicia-detection subsystem 20. The indicia-detection subsystem 20 is configured for analyzing the video acquired by the imaging subsystem 15 to determine whether the video contains an indicia. Typically, the indicia-detection subsystem 20 utilizes image processing software to analyze one or more video frames from the video acquired by the imaging subsystem 15. For example, the image processing software may analyze the raster of pixels to determine whether there is a pattern that matches the expected pattern for an indicia. Typically, the image processing software is stored on a computer-readable storage medium (e.g., computer memory) and is executed by a computer processor (e.g., central processing unit (CPU)).

The indicia-verification system 10 according to the present disclosure also includes a video-analysis subsystem 25. The video-analysis subsystem 25 analyzes the video acquired by the imaging subsystem 15 to determine whether the video of the indicia is of sufficient quality to merit the initiation of indicia verification (e.g., indicia verification processing). Factors that the video-analysis subsystem 25 may analyze in determining whether the video of the indicia is of sufficient quality typically include image resolution, video contrast, lighting, and position of the indicia within the video frame. The position of the indicia includes the distance of the indicia from the imaging subsystem's lens assembly 18 as well as the orientation (e.g., rotated, skewed, etc.) of the indicia with respect to the imaging subsystem's lens assembly 18. The video-analysis subsystem 25 may also detect and analyze image blur (e.g., motion blur) as part of a blur analysis. Blurring of the image can occur when there is relative motion between the imaging subsystem 15 and the object(s) being videoed. The relative motion results in blurring artifacts, or a blurring or smearing along the direction of relative motion. In this way, the system 10 according to the present disclosure uses the substantially real-time video feed acquired by the imaging subsystem 15 to determine when an indicia is within the imaging subsystem's field-of-view under conditions (e.g., proper positioning, proper lighting, etc.) that are likely to allow for the successful performance of indicia verification.

Although the acquired video affords an efficient and convenient way to determine the presence of an indicia, conducting an analysis of the video for the purposes of indicia verification is not ideal because video is typically not captured at a sufficiently-high resolution. Indicia verification typically requires a high-resolution image that can, for instance, clearly distinguish between light and dark areas in an image (e.g., between black bars and white spaces of a barcode). Consequently, when the video-analysis subsystem 25 determines that the video of the indicia is of sufficient quality to merit the initiation of indicia verification, the imaging subsystem 15 acquires a still image. To conserve computing and/or power resources, the imaging subsystem 15 typically stops acquiring video prior to transitioning to still image capture.

In general, the imaging subsystem 15 is configured to acquire still images at a substantially higher resolution than the video acquired by the imaging subsystem 15. For example, the still image would typically be at a resolution greater than about 200 pixels per inch (ppi) (e.g., 300 ppi), whereas the video would typically be captured at a resolution of less than about 100 pixels per inch (ppi). Furthermore, the still image is typically acquired by the imaging subsystem 15 within milliseconds (e.g., less than about 50 milliseconds) of the determination by the video-analysis subsystem 25 that the video of the indicia is of sufficient quality. As a result, in situations where the imager and/or the indicia is not in a fixed position, the indicia will generally continue to be within the field-of-view of the imaging subsystem 15; and the indicia will typically continue to be in substantially the same position and orientation in the still image that it was in the latest video. In other words, the still image that is acquired (e.g., captured) by the imaging subsystem 15 is likely to contain an indicia, and the indicia is likely to be in a position and orientation that is favorable for indicia verification.

In one embodiment, the system 10 acquires multiple still images. Although the preliminary use of video increases the likelihood of obtaining a suitable still image, the system 10 does not assume that the first acquired still image will be suitable for indicia verification. To increase the likelihood of successful indicia verification, the system 10 is configured to continuously acquire still images until the system acquires a still image that is suitable for indicia verification.

To ensure that the still image captured by the imaging subsystem 15 is suitable, the system 10 includes a still-image-analysis subsystem 30. The still-image-analysis subsystem 30 is configured to select for indicia verification a still image of the indicia that is of sufficient quality to undergo indicia verification. Typically, the still-image-analysis subsystem 30 employs image processing techniques to determine the quality of the still image. More particularly, the still-image-analysis subsystem 30 typically utilizes image processing software stored in memory and executed by a computer processor for analyzing the still image(s). The analysis performed by the still-image-analysis subsystem 30 typically considers factors such as image resolution, contrast, lighting, motion blur and the position of the indicia within the still image. The still-image-analysis subsystem 30 may analyze multiple still images until a suitable still image is acquired, at which time the still-image-analysis subsystem 30 selects the suitable still image for indicia verification processing.

The still-image-analysis subsystem 30 may be configured to provide user feedback (e.g., via the display device 17) regarding the quality of the last-acquired still image. The user feedback regarding the still image is intended to provide the user with instructions on how to improve the quality of the still image so as to obtain the highest-possible-quality image for verification processing. For example, the user feedback may provide information regarding image focus, flash, exposure, ISO settings, and any other camera parameter that would be ideally adjusted based on the initial feedback to provide the highest quality image for verification.

The system 10 also includes an indicia-analysis subsystem 35. Once the still-image-analysis subsystem 30 selects a suitable still image as described above, the indicia-analysis subsystem 35 performs indicia verification on the selected still image of the indicia. Typically, the indicia-analysis subsystem 35 employs image processing techniques to analyze the still image of the indicia to verify the indicia. More typically, the indicia-analysis subsystem 35 utilizes image processing software executed on a computer processor to verify the indicia depicted in the still image.

The indicia-analysis subsystem 35 may, for example, use an ANSI/ISO grading structure (e.g., ISO 15415 and 15416) or USPS Merlin standards, or customized standards, to verify the indicia. When verifying an indicia, the indicia-analysis subsystem 35 may consider multiple factors. First, the analysis may focus on obtaining information about the physical characteristics of the indicia. Generally, the indicia-analysis subsystem 35 evaluates the physical characteristics of the indicia based upon standards promulgated by the International Standards Organization (ISO) and the American National Standards Institute (ANSI). The physical characteristics of the indicia that may be evaluated by the verification subsystem 40 include edge determination, minimum reflectance, symbol contrast, minimum edge contrast, modulation, printing defects, quiet zone, and decodability.

In evaluating edge determination, the indicia-analysis subsystem 35 detects, in the case of a barcode, for example, whether the appropriate number of bars and spaces are present. A test of the minimum reflectance examines the difference in reflectance between the darkest bar and the background (usually white). For example, the indicia-analysis subsystem 35 may require that the darkest bar have a reflectance that is less than half of the background reflectance. Symbol contrast evaluates the color contrast between the darkest bars and the whitest spaces. Higher contrast is desirable to allow the indicia reader to more easily distinguish between dark bars and white spaces. A modulation test may reveal problems involving ink spread, where the ink bleeds from dark areas into light areas. The indicia-analysis subsystem 35 may identify printing defects that generally fall into one of two categories: voids and spots. Voids are light areas within dark bars. Spots are dark areas in the white spaces. These types of printing defects can lead to decoding errors when the indicia reader mistakenly identifies a dark bar as a white space due to the presence of a void. The indicia-analysis subsystem 35 may also evaluate if the indicia complies with quiet zone requirements. Standards for the creation of UPC symbols, for example, require that the UPC symbol have a quiet zone, or area of uniform light contrast, adjacent to the outer edges of the left and right guard bars.

As mentioned, in one embodiment the imaging subsystem 15 includes an imager 16, which may be the digital camera component of a smartphone. The imager 16 has a field-of-view. The imaging subsystem 15 typically also includes a display device 17. The display device 17 is in communication (e.g., electronic communication) with the imager 16 such that the display device 17 can display (e.g., show) images acquired by the imager 16. In other words, the display device 17 is configured to display video and still images of objects that are within the imager's field-of-view. The display device 17 is particularly useful for displaying, substantially in real-time, the video acquired by the imager 16. This real-time video display may assist the system user in positioning and orienting the imager 16 relative to the indicia. The user may monitor the video on the display device 17 to determine when the indicia comes into the field-of-view, and to manipulate the system 10 and/or indicia (e.g., object bearing the indicia) to obtain the best quality capture of the indicia.

Figure 3:
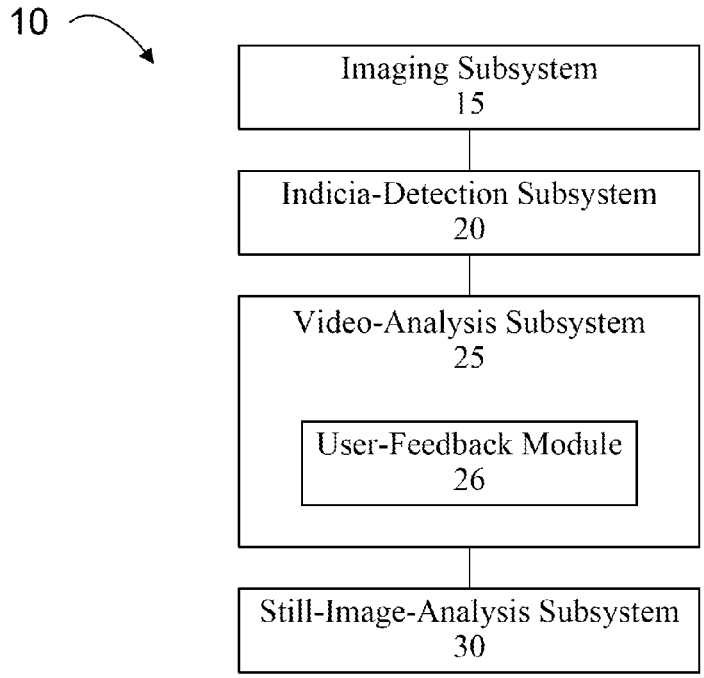
FIG. 3 is a block diagram illustrating a second alternative embodiment of an exemplary indicia-verification system according to the present disclosure.

Referring now to FIG. 3, in an alternative embodiment, the video-analysis subsystem 25 of the indicia-verification system 10 according to the present disclosure includes a user-feedback module 26 for providing the user with feedback for improving the video of the indicia. The user-feedback module is configured to provide the user with guidance on how the video of the indicia may be improved to increase the likelihood that the indicia-detection subsystem 20 will detect the presence of an indicia and/or the video-analysis subsystem 25 will deem that the video is of sufficient quality to initiate the capture of a high-resolution still image of the indicia. For example, the user-feedback module 26 may provide feedback that includes instructions to move the indicia either closer to or farther from the imaging subsystem.

The user feedback may be in the form of audible instructions (e.g., sound generated from speakers). The audible instructions may be in the form of tones (e.g., a pre-defined tone played when the indicia is positioned optimally with respect to the imaging subsystem 15). Alternatively, the audible instructions may be in the form of speech (e.g., pre-recorded audio stating, for example, "move the imager closer to the indicia").

The user feedback generated by the user-feedback module 26 may also be in the form of text. Typically, the text is advantageously displayed on the display device 17 so that the user may view the text feedback while simultaneously viewing the substantially real-time video acquired by the imaging subsystem 15. The user-feedback module 26 may, for instance, display text that advises the user to increase the lighting.

The user feedback generated by the user-feedback module 26 may also be in the form of a targeting graphic. Typically, the targeting graphic is a graphic displayed on the display device 17 that indicates the optimal placement of the indicia within the imaging subsystem's field-of-view. For example, the targeting graphic may be a rectangle displayed in the center of the display device 17, and the user is to manipulate the system 10 and/or the indicia until the indicia appears substantially within the boundaries of the targeting graphic.

Figure 4:
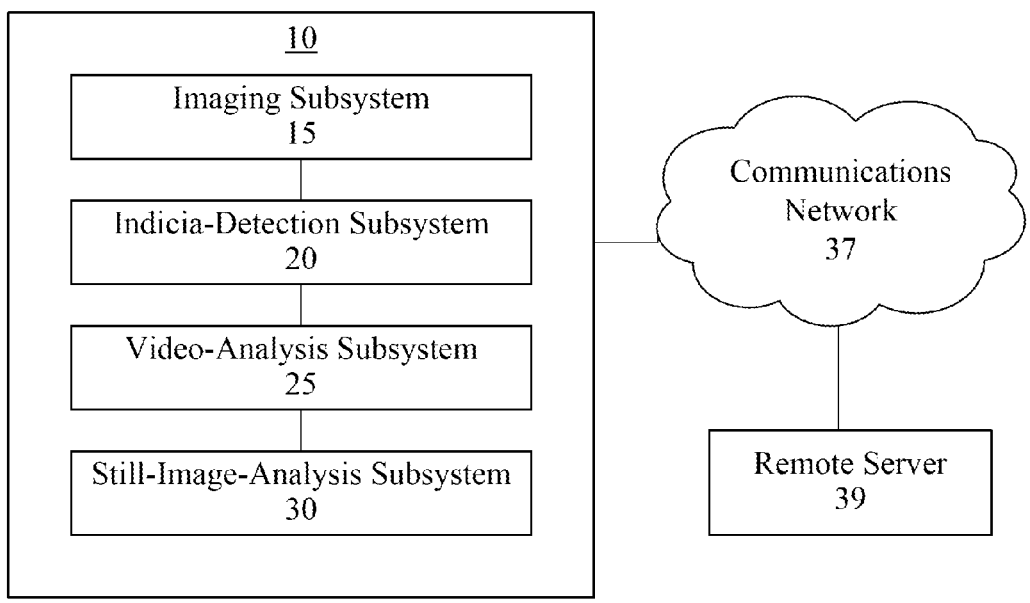
FIG. 4 is a block diagram illustrating a third alternative embodiment of an exemplary indicia-verification system according to the present disclosure.

Referring now to FIG. 4, in another aspect, the indicia-verification system 10 according to the present invention is configured for conducting the indicia verification processing at a separate location from that of the indicia that is being processed. By allowing the still image of the indicia to undergo verification processing at a remote site, the indicia-verification process can be managed in a more centralized manner, thereby ensuring, for example, uniformity in the application of verification techniques. Performing indicia verification at the remote server 39 (e.g., in the "cloud") also allows for the aggregation of verification data from, for example, multiple indicia-verification systems, for purposes of data aggregation, data mining, or other analytics. According to this alternative embodiment, the indicia-analysis subsystem (i) acquires the selected still image of the indicia from the still-image analysis subsystem; (ii) transmits the selected still image via a communications network 37 to a remote server 39 configured to perform indicia verification on the selected still image; and (iii) receives from the remote server 39, via the communications network 37, the results of the indicia verification. Typically the remote server 39 is a computer(s) having stored in memory software for performing indicia verification on the still image. Typically, the remote server 39 is connected to the still-image-analysis subsystem 30 via a communications network 37 such as a local area network (LAN), a wide area network (WAN), or the Internet. Usually, the remote server 39 is configured to communicate substantially simultaneously with multiple indicia-verification systems 10. After performing the appropriate verification processing on the still image of the indicia, the remote server 39 transmits the results of the verification processing back to the system 10 via the communications network. Typically, the results of the verification are displayed to the user on the display device 17. The remote server 39 may also transmit additional information such as the result of analytics (e.g., data mining) or an image of the object that is expected to be associated with the indicia in the selected still image.

The disclosure has referred to the functionality of the system 10 in terms of indicia verification. It will be understood by a person of ordinary skill in the art that the system 10 may also be used for purposes of indicia validation.

Figure 5:
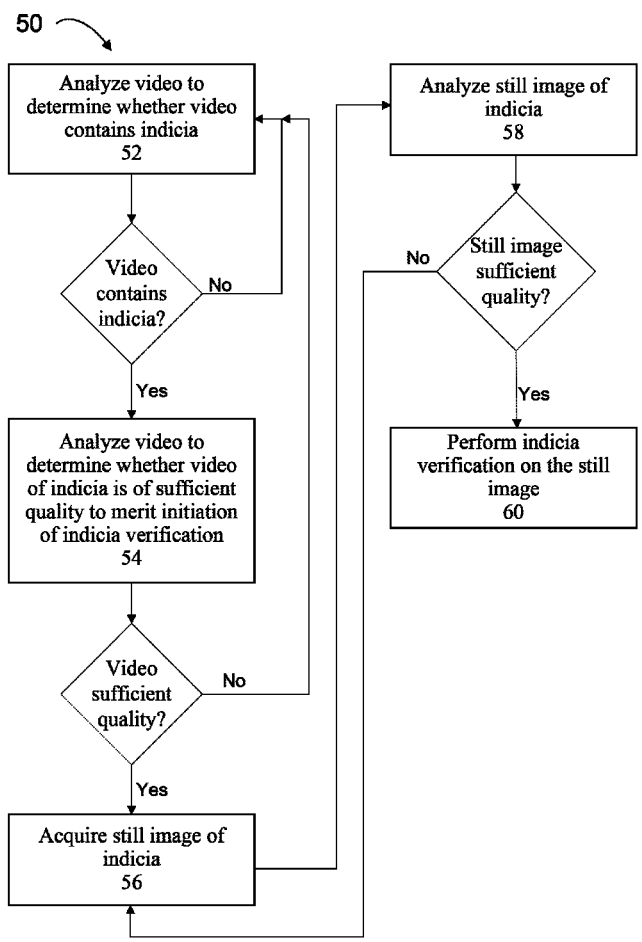
FIG. 5 is a block diagram illustrating an exemplary method of indicia verification according to the present disclosure.

Referring now to FIG. 5, in another aspect, the present disclosure embraces an indicia-verification method 50. Typically, the method 50 is implemented using a computer(s) adapted for acquiring and analyzing video and still images. For instance, the method 50 may be implemented using a smartphone having stored in memory a computer program(s) adapted for acquiring and analyzing video and still images.

Video (e.g., real-time or live video) is analyzed to determine whether the video contains an indicia 52. If the analysis determines that the video contains an indicia, the video is further analyzed to determine whether the video of the indicia is of sufficient quality to merit the initiation of indicia verification 54. If the video of the indicia is of sufficient quality to merit the initiation of indicia verification, a still image of the indicia is acquired 56. The still image of the indicia is analyzed to determine if the still image is of sufficient quality to undergo indicia verification 58. If the still image of the indicia is of sufficient quality to undergo indicia verification, indicia verification is performed on the still image 60.

In one embodiment of the method 50 according to the present disclosure, the results of the indicia verification are displayed on a display device such as an LCD screen. In another exemplary embodiment, still images of the indicia are continuously acquired until a still image is acquired that is of sufficient quality to undergo indicia verification.

To supplement the present disclosure, this application incorporates entirely by reference the following patents, patent application publications, and patent applications: U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; D702,237; International Publication No. 2013/163789; International Publication No. 2013/173985; International Publication No. 2014/019130; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2011/0202554; U.S. Patent Application Publication No. 2012/0111946; U.S. Patent Application Publication No. 2012/0138685; U.S. Patent Application Publication No. 2012/0168511; U.S. Patent Application Publication No. 2012/0168512; U.S. Patent Application Publication No. 2012/0193407; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0056285; U.S. Patent Application Publication No. 2013/0070322; U.S. Patent Application Publication No. 2013/0075168; U.S. Patent Application Publication No. 2013/0082104; U.S. Patent Application Publication No. 2013/0175341; U.S. Patent Application Publication No. 2013/0175343; U.S. Patent Application Publication No. 2013/0200158; U.S. Patent Application Publication No. 2013/0214048; U.S. Patent Application Publication No. 2013/0256418; U.S. Patent Application Publication No. 2013/0257744; U.S. Patent Application Publication No. 2013/0257759; U.S. Patent Application Publication No. 2013/0270346; U.S. Patent Application Publication No. 2013/0278425; U.S. Patent Application Publication No. 2013/0287258; U.S. Patent Application Publication No. 2013/0292474; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306730; U.S. Patent Application Publication No. 2013/0306731; U.S. Patent Application Publication No. 2013/0306734; U.S. Patent Application Publication No. 2013/0307964; U.S. Patent Application Publication No. 2013/0308625; U.S. Patent Application Publication No. 2013/0313324; U.S. Patent Application Publication No. 2013/0313325; U.S. Patent Application Publication No. 2013/0313326; U.S. Patent Application Publication No. 2013/0327834; U.S. Patent Application Publication No. 2013/0341399; U.S. Patent Application Publication No. 2013/0342717; U.S. Patent Application Publication No. 2014/0001267; U.S. Patent Application Publication No. 2014/0002828; U.S. Patent Application Publication No. 2014/0008430; U.S. Patent Application Publication No. 2014/0008439; U.S. Patent Application Publication No. 2014/0021256; U.S. Patent Application Publication No. 2014/0025584; U.S. Patent Application Publication No. 2014/0027518; U.S. Patent Application Publication No. 2014/0034723; U.S. Patent Application Publication No. 2014/0034734; U.S. Patent Application Publication No. 2014/0036848; U.S. Patent Application Publication No. 2014/0039693; U.S. Patent Application Publication No. 2014/0042814; U.S. Patent Application Publication No. 2014/0049120; U.S. Patent Application Publication No. 2014/0049635; U.S. Patent Application Publication No. 2014/0061305; U.S. Patent Application Publication No. 2014/0061306; U.S. Patent Application Publication No. 2014/0061307; U.S. Patent Application Publication No. 2014/0063289; U.S. Patent Application Publication No. 2014/0066136; U.S. Patent Application Publication No. 2014/0067692; U.S. Patent
Application Publication No. 2014/0070005; U.S. Patent
Application Publication No. 2014/0071840; U.S. Patent
Application Publication No. 2014/0074746; U.S. Patent
Application Publication No. 2014/0075846; U.S. Patent
Application Publication No. 2014/0076974; U.S. Patent
Application Publication No. 2014/0078341; U.S. Patent
Application Publication No. 2014/0078342; U.S. Patent
Application Publication No. 2014/0078345; U.S. Patent
Application Publication No. 2014/0084068; U.S. Patent
Application Publication No. 2014/0086348; U.S. Patent
Application Publication No. 2014/0097249; U.S. Patent
Application Publication No. 2014/0098284; U.S. Patent
Application Publication No. 2014/0098792; U.S. Patent
Application Publication No. 2014/0100774; U.S. Patent
Application Publication No. 2014/0100813; U.S. Patent
Application Publication No. 2014/0103115; U.S. Patent
Application Publication No. 2014/0104413; U.S. Patent
Application Publication No. 2014/0104414; U.S. Patent
Application Publication No. 2014/0104416; U.S. Patent
Application Publication No. 2014/0104451; U.S. Patent
Application Publication No. 2014/0106594; U.S. Patent
Application Publication No. 2014/0106725; U.S. Patent
Application Publication No. 2014/0108010; U.S. Patent
Application Publication No. 2014/0108402; U.S. Patent
Application Publication No. 2014/0108682; U.S. Patent
Application Publication No. 2014/0110485; U.S. Patent
Application Publication No. 2014/0114530; U.S. Patent
Application Publication No. 2014/0124577; U.S. Patent
Application Publication No. 2014/0124579; U.S. Patent
Application Publication No. 2014/0125842; U.S. Patent
Application Publication No. 2014/0125853; U.S. Patent
Application Publication No. 2014/0125999; U.S. Patent
Application Publication No. 2014/0129378;

U.S. patent application Ser. No. 13/367,978 for a Laser Scanning Module Employing An Elastomeric U-Hinge Based Laser Scanning Assembly, filed Feb. 7, 2012 (Feng et al.);

U.S. patent application No. 29/436,337 for an Electronic Device, filed Nov. 5, 2012 (Fitch et al.);

U.S. patent application Ser. No. 13/736,139 for an Electronic Device Enclosure, filed Jan. 8, 2013 (Chaney);

U.S. patent application Ser. No. 13/771,508 for an Optical Redirection Adapter, filed Feb. 20, 2013 (Anderson);

U.S. patent application Ser. No. 13/780,356 for a Mobile Device Having Object-Identification Interface, filed Feb. 28, 2013 (Samek et al.);

U.S. patent application Ser. No. 13/852,097 for a System and Method for Capturing and Preserving Vehicle Event Data, filed Mar. 28, 2013 (Barker et al.);

U.S. patent application Ser. No. 13/902,110 for a System and Method for Display of Information Using a Vehicle-Mount Computer, filed May 24, 2013 (Hollifield);

U.S. patent application Ser. No. 13/902,144, for a System and Method for Display of Information Using a Vehicle-Mount Computer, filed May 24, 2013 (Chamberlin);

U.S. patent application Ser. No. 13/902,242 for a System For Providing A Continuous Communication Link With A Symbol Reading Device, filed May 24, 2013 (Smith et al.);

U.S. patent application Ser. No. 13/912,262 for a Method of Error Correction for 3D Imaging Device, filed Jun. 7, 2013 (Jovanovski et al.);

U.S. patent application Ser. No. 13/912,702 for a System and Method for Reading Code Symbols at Long Range Using Source Power Control, filed Jun. 7, 2013 (Xian et al.);

U.S. patent application No. 29/458,405 for an Electronic Device, filed Jun. 19, 2013 (Fitch et al.);

U.S. patent application Ser. No. 13/922,339 for a System and Method for Reading Code Symbols Using a Variable Field of View, filed Jun. 20, 2013 (Xian et al.);

U.S. patent application Ser. No. 13/927,398 for a Code Symbol Reading System Having Adaptive Autofocus, filed Jun. 26, 2013 (Todeschini);

U.S. patent application Ser. No. 13/930,913 for a Mobile Device Having an Improved User Interface for Reading Code Symbols, filed Jun. 28, 2013 (Gelay et al.);

U.S. patent application No. 29/459,620 for an Electronic Device Enclosure, filed Jul. 2, 2013 (London et al.);

U.S. patent application No. 29/459,681 for an Electronic Device Enclosure, filed Jul. 2, 2013 (Chaney et al.);

U.S. patent application Ser. No. 13/933,415 for an Electronic Device Case, filed Jul. 2, 2013 (London et al.);

U.S. patent application No. 29/459,785 for a Scanner and Charging Base, filed Jul. 3, 2013 (Fitch et al.);

U.S. patent application No. 29/459,823 for a Scanner, filed Jul. 3, 2013 (Zhou et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application No. 29/468,118 for an Electronic Device Case, filed Sep. 26, 2013 (Oberpriller et al.);

U.S. patent application Ser. No. 14/047,896 for Terminal Having Illumination and Exposure Control filed Oct. 7, 2013 (Jovanovski et al.);

U.S. patent application Ser. No. 14/053,175 for Imaging Apparatus Having Imaging Assembly, filed Oct. 14, 2013 (Barber);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/118,400 for Indicia Decoding Device with Security Lock, filed Nov. 18, 2013 (Liu);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/154,915 for Laser Scanning Module Employing a Laser Scanning Assembly having Elastomeric Wheel Hinges, filed Jan. 14, 2014 (Havens et al.);

U.S. patent application Ser. No. 14/158,126 for Methods and Apparatus to Change a Feature Set on Data Collection Devices, filed Jan. 17, 2014 (Berthiaume et al.);

U.S. patent application Ser. No. 14/159,074 for Wireless Mesh Point Portable Data Terminal, filed Jan. 20, 2014 (Wang et al.);

U.S. patent application Ser. No. 14/159,509 for MMS Text Messaging for Hand Held Indicia Reader, filed Jan. 21, 2014 (Kearney);

U.S. patent application Ser. No. 14/159,603 for Decodable Indicia Reading Terminal with Optical Filter, filed Jan. 21, 2014 (Ding et al.);

U.S. patent application Ser. No. 14/160,645 for Decodable Indicia Reading Terminal with Indicia Analysis Functionality, filed Jan. 22, 2014 (Nahill et al.);

U.S. patent application Ser. No. 14/161,875 for System and Method to Automatically Discriminate Between Different Data Types, filed Jan. 23, 2014 (Wang);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/176,417 for Devices and Methods Employing Dual Target Auto Exposure filed Feb. 10, 2014 (Meier et al.);

U.S. patent application Ser. No. 14/187,485 for Indicia Reading Terminal with Color Frame Processing filed Feb. 24, 2014 (Ren et al.);

U.S. patent application Ser. No. 14/200,405 for Indicia Reader for Size-Limited Applications filed Mar. 7, 2014 (Feng et al.);

U.S. patent application Ser. No. 14/222,994 for Method and Apparatus for Reading Optical Indicia Using a Plurality of Data filed Mar. 24, 2014 (Smith et al.);

U.S. patent application Ser. No. 14/230,322 for Focus Module and Components with Actuator filed Mar. 31, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/249,497 for Terminal Having Plurality of Operating Modes filed Apr. 10, 2014, (Grunow et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.)

U.S. patent application Ser. No. 14/257,364 for Docking System and Method Using Near Field Communication filed Apr. 21, 2014, (Showering);

U.S. patent application Ser. No. 14/264,173 for Autofocus Lens System for Indicia Readers filed Apr. 29, 2014, (Ackley et al.);

U.S. patent application Ser. No. 14/274,858 for Mobile Printer with Optional Battery Accessory filed May 12, 2014, (Marty et al.);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/342,551 for Terminal Having Image Data Format Conversion filed Mar. 4, 2014 (Lui et al.);

U.S. patent application Ser. No. 14/345,735 for Optical Indicia Reading Terminal with Combined Illumination filed Mar. 19, 2014 (Ouyang);

U.S. patent application No. 29/486,759 for an Imaging Terminal, filed Apr. 2, 2014 (Oberpriller et al.); and U.S. patent application Ser. No. 14/355,613 for Optical Indicia Reading Terminal with Color Image Sensor filed May 1, 2014, (Lu et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An indicia-verification system, comprising:
an imaging subsystem for acquiring video and still images;
an indicia-detection subsystem for analyzing the video acquired by the imaging subsystem to determine whether the video contains an indicia;
a video-analysis subsystem for analyzing the video acquired by the imaging subsystem to determine whether the video of the indicia is of sufficient quality to merit the initiation of indicia verification;
a still-image-analysis subsystem for selecting for indicia verification a still image of the indicia that is of sufficient quality to undergo indicia verification; and
an indicia-analysis subsystem for performing indicia verification on the selected still image of the indicia;
wherein the imaging subsystem is configured to acquire still images at a substantially higher resolution than the video acquired by the imaging subsystem; and
wherein the imaging subsystem continuously acquires a new still image of the indicia until the still-image-analysis subsystem selects a still image that is of sufficient quality to undergo indicia verification.

2. The indicia-verification system according to claim 1, wherein the imaging subsystem comprises an imager and a display device.

3. The indicia-verification system according to claim 2, wherein the imager has a field-of-view and the display device is configured to display video and still images of objects that are within the imager's field-of-view.

4. The indicia-verification system according to claim 2, wherein the imager comprises a lens assembly and an image sensor.

5. The indicia-verification system according to claim 1, wherein the determination of whether the video of the indicia is of sufficient quality to merit the initiation of indicia verification includes an analysis of the video's resolution.

6. The indicia-verification system according to claim 1, wherein the determination of whether the video of the indicia is of sufficient quality to merit the initiation of indicia verification includes an analysis of the position of the indicia in the video, wherein the position of the indicia includes the distance of the indicia from the imaging subsystem's lens assembly and the orientation of the indicia with respect to the imaging subsystem's lens assembly.

7. The indicia-verification system according to claim 1, wherein the determination of whether the video of the indicia is of sufficient quality to merit the initiation of indicia verification includes an analysis of the contrast of the video.

8. The indicia-verification system according to claim 1, wherein the determination of whether the video of the indicia is of sufficient quality to merit the initiation of indicia verification includes an analysis of the video's motion blur.

9. The indicia-verification system according to claim 1, wherein the determination of whether the video of the indicia is of sufficient quality to merit the initiation of indicia verification includes an analysis of (i) the video's resolution, (ii) the position of the indicia in the video, wherein the position of the indicia includes the distance of the indicia from the imaging subsystem and the orientation of the indicia with respect to the imaging subsystem, (iii) the contrast of the video, and (iv) the video's motion blur.

10. The indicia-verification system according to claim 1, wherein when the video-analysis subsystem determines that the video of the indicia is of sufficient quality to merit the initiation of indicia verification, the imaging-subsystem stops acquiring video and acquires a still image of the indicia.

11. The indicia-verification system according to claim 1, wherein the video-analysis subsystem comprises a user-feedback module for providing the user with feedback for improving the video of the indicia.

12. The indicia-verification system according to claim 11, wherein the feedback provided by the user-feedback module includes instructions to move the indicia either closer to or farther from the imaging subsystem.

13. The indicia-verification system according to claim 11, wherein the feedback provided by the user-feedback module includes a targeting graphic.

14. An indicia-verification system, comprising:
an imaging subsystem for acquiring video and still images;
an indicia-detection subsystem for analyzing the video acquired by the imaging subsystem to determine whether the video contains an indicia;
a video-analysis subsystem for analyzing the video acquired by the imaging subsystem to determine whether the video of the indicia is of sufficient quality to merit the initiation of indicia verification;
a still-image-analysis subsystem for selecting for indicia verification a still image of the indicia that is of sufficient quality to undergo indicia verification; and
an indicia-analysis subsystem for (i) acquiring the selected still image of the indicia from the still-image analysis subsystem, (ii) transmitting the selected still image via a communications network to a remote server configured to perform indicia verification on the selected still image, and (iii) receiving from the remote server via the communications network the results of the indicia verification;
wherein the imaging subsystem is configured to acquire still images at a substantially higher resolution than the video acquired by the imaging subsystem; and
wherein the imaging subsystem continuously acquires a new still image of the indicia until the still-image-analysis subsystem selects a still image that is of sufficient quality to undergo indicia verification.

15. The indicia-verification system of claim 14, wherein the indicia-analysis subsystem is configured for displaying the results of the indicia verification on a display device.

16. An indicia-verification method, comprising:
analyzing video to determine whether the video contains an indicia;
if the video contains an indicia, analyzing the video to determine whether the video of the indicia is of sufficient quality to merit the initiation of indicia verification;
if the video of the indicia is of sufficient quality to merit the initiation of indicia verification, acquiring a still image of the indicia;
analyzing the still image of the indicia to determine if it is of sufficient quality to undergo indicia verification; and
if the still image of the indicia is of sufficient quality to undergo indicia verification, performing indicia verification on the still image;
acquiring still images at a substantially higher resolution than the video; and
continuously acquiring a new still image of the indicia until the still image is of sufficient quality to undergo indicia verification.

17. The method of claim 16, further comprising:
displaying the results of the indicia verification on a display device.

* * * * *